US008397009B2

(12) United States Patent
Jacquet

(10) Patent No.: US 8,397,009 B2
(45) Date of Patent: Mar. 12, 2013

(54) INTERCONNECTION NETWORK WITH DYNAMIC SUB-NETWORKS

(75) Inventor: Francois Jacquet, Froges (FR)

(73) Assignee: Commissariat a l'Energie Atomique et aux energies alternatives, Paris (FR)

( * ) Notice: Subject to any disclaimer, the term of this patent is extended or adjusted under 35 U.S.C. 154(b) by 145 days.

(21) Appl. No.: 12/792,218

(22) Filed: Jun. 2, 2010

(65) Prior Publication Data

US 2010/0312939 A1 Dec. 9, 2010

(30) Foreign Application Priority Data

Jun. 8, 2009 (FR) ...................................... 09 53780

(51) Int. Cl.
*G06F 13/00* (2006.01)
*G06F 13/28* (2006.01)
(52) U.S. Cl. ........ 710/316; 710/317; 711/130; 711/148; 711/149; 370/395.31; 370/397; 370/416
(58) Field of Classification Search .................. 710/306, 710/312, 316, 317; 711/130, 149; 370/397, 370/395.31, 416
See application file for complete search history.

(56) References Cited

U.S. PATENT DOCUMENTS

| 4,891,802 | A | | 1/1990 | Jasmer et al. | |
|---|---|---|---|---|---|
| 5,218,240 | A | * | 6/1993 | Camarota et al. | 326/39 |
| 5,559,970 | A | * | 9/1996 | Sharma | 710/317 |
| 5,602,844 | A | * | 2/1997 | Lyles | 370/395.31 |
| 5,930,256 | A | * | 7/1999 | Greene et al. | 370/397 |
| 6,799,252 | B1 | * | 9/2004 | Bauman | 711/149 |
| 6,970,967 | B2 | * | 11/2005 | Bosshart | 710/317 |
| 7,769,942 | B2 | * | 8/2010 | Ware et al. | 710/317 |
| 7,791,976 | B2 | * | 9/2010 | Rao et al. | 365/227 |
| 7,925,816 | B2 | * | 4/2011 | Olesinski et al. | 710/316 |
| 8,006,026 | B2 | * | 8/2011 | Kajigaya | 710/317 |
| 2012/0017107 | A1 | * | 1/2012 | Lee | 713/400 |

FOREIGN PATENT DOCUMENTS

EP 0 868 054 A2 9/1998
FR 2 036 350 12/1970

OTHER PUBLICATIONS

NTT Communication Switching Labratories—"A New Self-Routing Switch Driven with Input-to-Output Address Difference", 5 pages; Dated 1988.*
MIT Artificial Intelligence Labratory—"A Parallel Crossbar Routing Chip for a Shared Memory Multiprocessor" by Henry Minsky; 117 pages, Dated Jan. 1991.*

* cited by examiner

*Primary Examiner* — Brian Misiura
(74) *Attorney, Agent, or Firm* — Oblon, Spivak, McClelland, Maier & Neustadt, L.L.P.

(57) ABSTRACT

An interconnection network with m first electronic circuits and n second electronic circuits, comprising m interconnection sub-networks, each interconnection sub-network including: at least one addressing bus and one information transfer bus connecting one of the m first circuits to all the n second circuits, the information transfer bus comprising a plurality of portions of signal transmission lines connected to each other through signal repeater devices, and a controller device that controls the signal repeater devices, at least one of the signal repeater devices is controlled to be active depending on a value of an addressing signal to be sent to the addressing bus by said one of the m first circuits to the controller device, where m and n are integer numbers greater than 1.

13 Claims, 5 Drawing Sheets

INTERCONNECTION NETWORK WITH DYNAMIC SUB-NETWORKS

TECHNICAL FIELD

This document relates to a dynamic network of interconnections, in other words a network for which the topology or connections within this network can change as a function of the sources and destinations of data to be routed. It is particularly applicable to the interconnection of multiple processors (for example arranged in clusters) with multiple memory blocks, for example a memory shared by these processors.

STATE OF PRIOR ART

A dynamic interconnection network is a network for which the topology, in other words the connections, can vary during execution of a program or between several executions of different programs. This type of interconnection network is used particularly in applications in the field of parallel computer architectures. FIG. 1 diagrammatically shows a dynamic network 1 connecting n first elements, for example five memory blocks 3.1-3.5 in a shared memory 3, and m second elements, for example elementary processors 5.1-5.6, where n and m are non-zero natural integer numbers. Such a dynamic network 1 enables each processor 5.1-5.6 to communicate with each of the memory blocks 3.1-3.5. Thus, data stored in the memory blocks 3.1-3.5 may be shared between all processors 5.1-5.6.

This dynamic network 1 may be made in the form of a "crossbar" network as shown in FIG. 2. This dynamic network comprises n×m switches 7, in other words 30 switches in the example in FIG. 2 connected to each other in the form of a 5×6 table (6 rows, 5 columns). Thus, when one of the processors 5.1-5.6 wants to write or read data into one of the memory blocks 3.1-3.5, the switches 7 located on a path connecting this processor and this memory block are active so as to form a communication link between this processor and this memory block.

However, such a network has the disadvantage that under some situations, the number of processors that can work simultaneously is limited. For example, when the processor 5.6 writes data into the memory block 3.5, it is impossible for another processor to communicate with one of the memory blocks 3.1-3.5, given that all the switches used to form a connection with the shared memory 3 are occupied in forming the communication path between the processor 5.6 and the memory block 3.5.

PRESENTATION OF THE INVENTION

Thus there is a need to propose new interconnection network architecture to simultaneously create several parallel connections independent of the different elements between them.

To achieve this, one embodiment proposes an interconnection network with m first electronic circuits and n second electronic circuits, comprising m interconnection sub-networks, each interconnection sub-network comprising:

at least one addressing bus and one information transfer bus connecting one of the m first circuits to all the n second circuits, the information transfer bus comprising a plurality of portions of signal transmission lines connected to each other through signal repeater devices, means of controlling the repeater devices capable of making at least one of the repeater devices active depending on the value of an addressing signal to be sent to the addressing bus by said one of the m first circuits to the control means, the active repeater device forming a communication path in the information transfer bus for data signals between said one of the m first circuits and at least one of the n second circuits and/or between at least a first one of the n second circuits and at least a second one of the n second circuits, m and n are integer numbers greater than 1.

This interconnection network is applicable in general to all types of electronic, electrical, microelectronic, nanoelectronic and even photonic circuits.

With such a network, the m first circuits can share information such as stored data and/or data read in the n second circuits. Furthermore, considering that this network is composed of one sub-network for each first circuit, each of the m sub-networks can operate independently and simultaneously with the other sub-networks. Thus all the m first circuits may communicate simultaneously with the n second circuits.

Since only repeater devices located on the path between the two circuits exchanging data can be active, in other words powered electrically or made conducting, consumption of electricity in this interconnection network is less than it would be in an interconnection network according to prior art. Therefore, the control means may make some repeater devices active and other repeater devices inactive to form a communication path in the information transfer bus.

The m first circuits may be or may comprise processors, and/or the n second circuits may be or may comprise memory blocks of a memory shared by the m first circuits. Each memory block may comprise several distinct memory registers.

The signal repeater devices on the information transfer bus may be two-directional, allowing both read and write operations on the same communication bus.

The addressing bus may comprise a plurality of portions of signal transmission lines, for example electrically conducting wires or optical transmission lines such as optical fibres connected to each other by signal repeater devices.

The signal repeater devices may comprise logical circuits.

The control means of the repeater devices may also comprise a selector of, or means of selecting, at least one of the n second circuits to make at least one data read and/or write operation in said one of the n second circuits, and/or a managing device of, or means of managing, the access priority to the n second circuits through the m first circuits and/or a device for memorising, or means of memorising, several addresses of second circuits.

The control means may comprise a plurality of control devices, each control device being capable of making one of said repeater devices active or inactive as a function of the value of the addressing signal.

When the n second circuits comprise memory blocks of a shared memory, the control devices may be implemented in the shared memory.

The control means may comprise n control devices.

Each of the control devices may comprise similar logical circuits, a distinct code being designed to be applied at the input to each control device to identify at least one of the n second circuits. These codes may be recorded, or hard coded, in memory and applied to the inputs of the control devices so that they can be differentiated from each other.

Each interconnection sub-network may comprise a second information transfer bus comprising a plurality of portions of signal transmission lines connected to each other through second signal repeater devices, the control means being capable of making at least one of the second repeater devices active as a function of the value of the addressing signal, the second active repeater device forming a signal communication path between said one of the m first circuits and said one of the n second circuits, or between said first of the n second circuits and said second of the n second circuits, in the second information transfer bus.

BRIEF DESCRIPTION OF THE DRAWINGS

This invention will be better understood after reading the description of example embodiments given purely for guidance without being limitative in any way, with reference to the appended drawings in which.

Identical, similar or equivalent parts of the different figures described below have the same numeric references so as to facilitate comparison between one figure and another.

The different parts shown in the figures are not necessarily all at the same scale, to make the figures easier to read.

The different possibilities (variants and embodiments) must be understood as being not mutually exclusive of each other and they can be combined together.

DETAILED PRESENTATION OF PARTICULAR EMBODIMENTS

Figure 1:
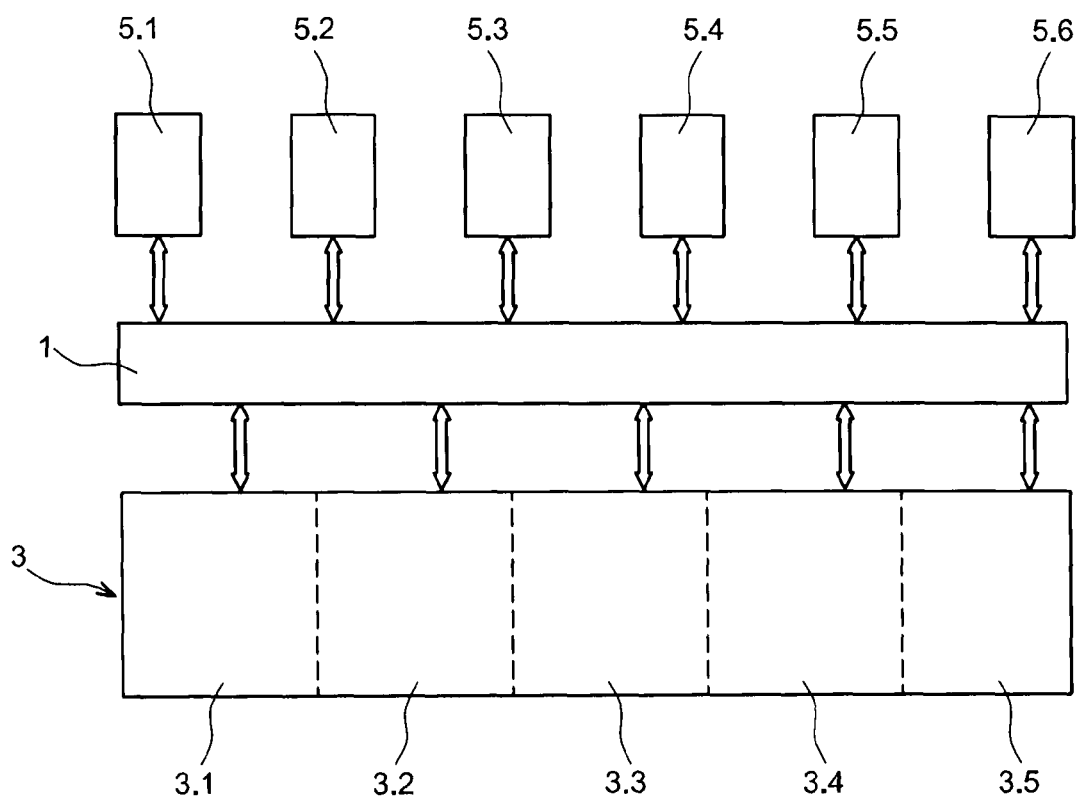
FIG. 1 schematically shows a dynamic interconnection network connecting several elements to each other, FIG. 2 schematically shows a crossbar type interconnection network according to prior art, connecting several elements to each other, FIG. 3 schematically shows an example of an interconnection sub-network connecting a first electronic circuit to four second electronic circuits in an interconnection network.
Figure 2:
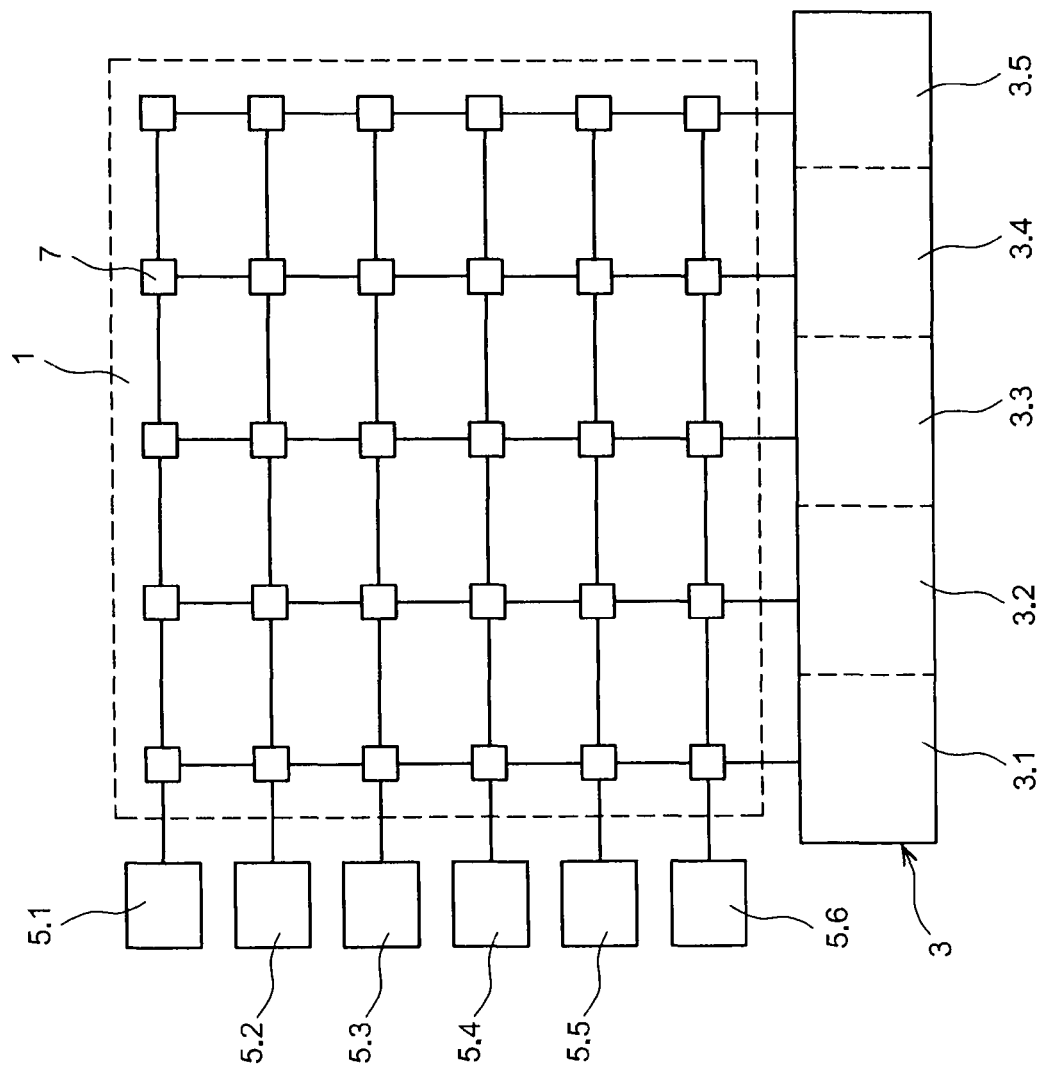
Figure 3:
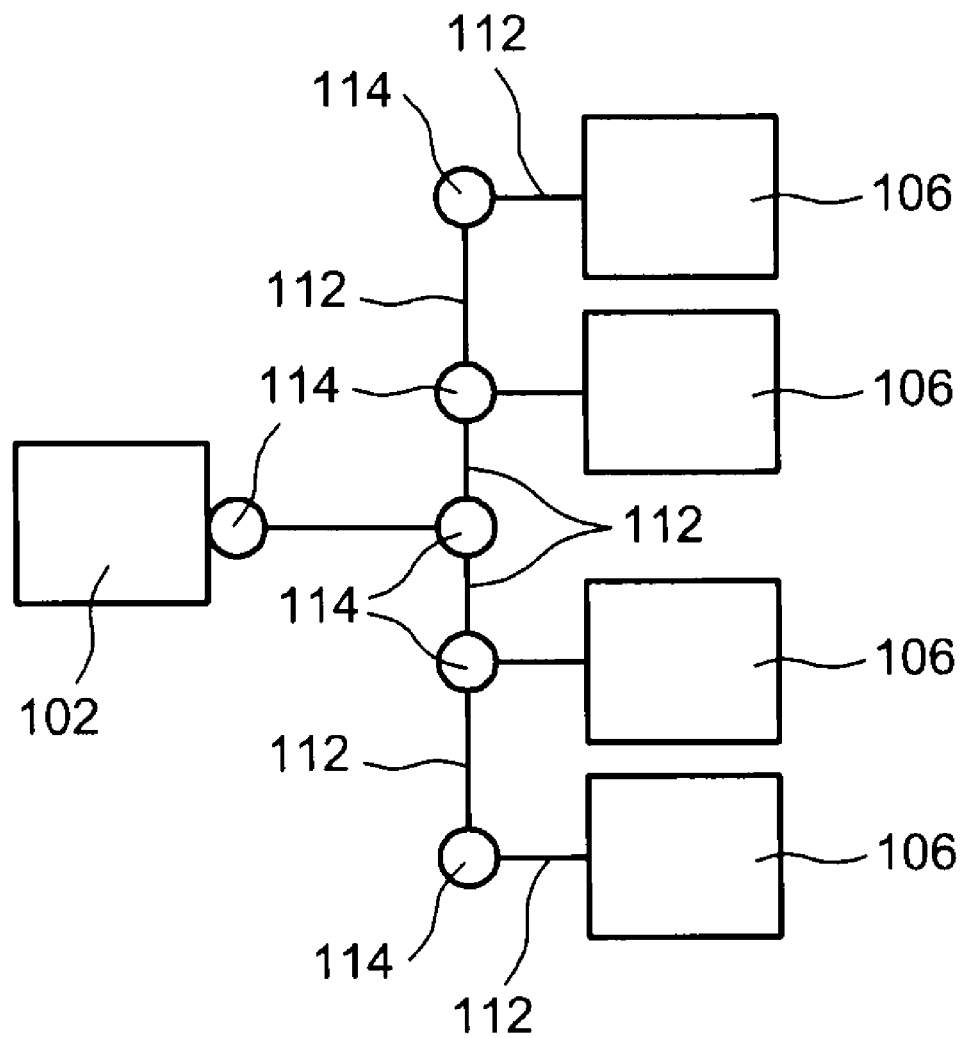

Refer firstly to FIG. 3 that diagrammatically shows an interconnection sub-network connecting a first electronic circuit 102, for example a processor, with several second electronic circuits 106, for example four memory blocks of a shared memory. Although FIG. 3 shows a single interconnection sub-network, an interconnection network to which this interconnection sub-network belongs, comprises one or several other interconnection sub-networks, for example similar to the sub-network shown in this FIG. 3, and connecting other first electronic circuits 102 to the four memory blocks 106.

The interconnection sub-network shown in FIG. 3 allows the processor 102 to write or read data in the memory blocks 106. To achieve this, the sub-network comprises several portions of transmission lines, for example conducting tracks, forming an addressing bus and an information transfer bus between the processor 102 and each of the four memory blocks 106. On the example shown in FIG. 3, only the information transfer bus is shown by portions of conducting tracks 112.

In this case, the information transfer bus is two-directional and for example can be used to route data signals emitted by the processor 102 to be written in at least one of the memory blocks 106, and/or data signals that are read by the processor 102 from at least one of the memory blocks 106, and/or data signals routed from one of the memory blocks 106 to at least one other memory block 106, through control of the processor 102. This information transfer bus can also be configured, in other words each data signal emitted on this bus can only be transmitted to the memory block 106 or to the processor 102 to which this signal is intended, forming a specific communication path in the sub-network for this data signal. In one variant, for example when the sub-network is only intended to transfer data from the processor 102 to the memory blocks 106 or vice versa, the information transfer bus may be unidirectional.

The information transfer bus can also route information other than the data itself, for example read/write signals for which the value indicates if a read operation or a write operation is done in the memory block 106, and possibly query validation signals that may or may not validate the read/write operation. In particular, the read, write signal may be used when the information transfer bus is two-directional to determine the transition direction of the data in this bus (from processor 102 to a memory block 106 or vice versa). When each of the memory block 106 comprises a plurality of memory sub-blocks each forming a different memory location, such as memory registers, it is also possible to transit the address of the destination memory sub-block (called "Chip select"), on the information transfer bus, for example in the form of a signal distinct from the signal comprising the sent data or one or several bits concatenated with the data bits sent. Other signals may also be transmitted on the information transfer bus.

The addressing bus routes addressing signals of destination memory blocks 106, for which the value denotes the memory block 106 in which the read or write operation is done. This addressing bus may be unidirectional. In this case the addressing bus cannot be configured because signals sent on the addressing bus are transmitted to all memory blocks 106 so that each memory block 106 can analyse these data and a communication path can be set up between the processor 102 and the destination memory block 106.

The information transfer bus can be configured by means of signal repeater devices 114 arranged between each portion of the conducting track 112 so that these portions 112 can be connected to each other and thus form continuous communication paths. Each of these repeater devices 114 may be made active or inactive, for example by electrically powering it or not. It is thus possible to define a communication path in each sub-network by only activating the repeater devices 114 actually located on the path between the processor 102 and the memory block 106 into which the processor 102 will write the data or from which the processor 102 will read the data. The repeater devices 114 may or may not be activated depending on the value of the signal transmitted on the addressing bus that is read by the control means, not shown in FIG. 3, this control means electrically powering each of the repeater devices 114 or not depending on whether or not the repeater device 114 is located on the communication path to be set up in the information transfer bus.

In one variant, the control means may comprise registers capable of memorising several addresses and thus successively configuring several communication paths in the information transfer bus in order to successively route several data signals to distinct memory blocks 106 and/or to the processor 102.

It is also possible that the interconnection sub-network comprises a second information transfer bus to transmit other signals between the processor 102 and one of the memory block 106 in parallel to the first information transfer bus. In the same way as for the first information transfer bus, this second information transfer bus can be configured by activating or not activating repeaters to form a specific communication path between the processor 102 and at least one of the memory blocks 106 or between two memory blocks 106. This second information transfer bus may also be two-directional or unidirectional depending on the type of information to be routed.

Figure 4:
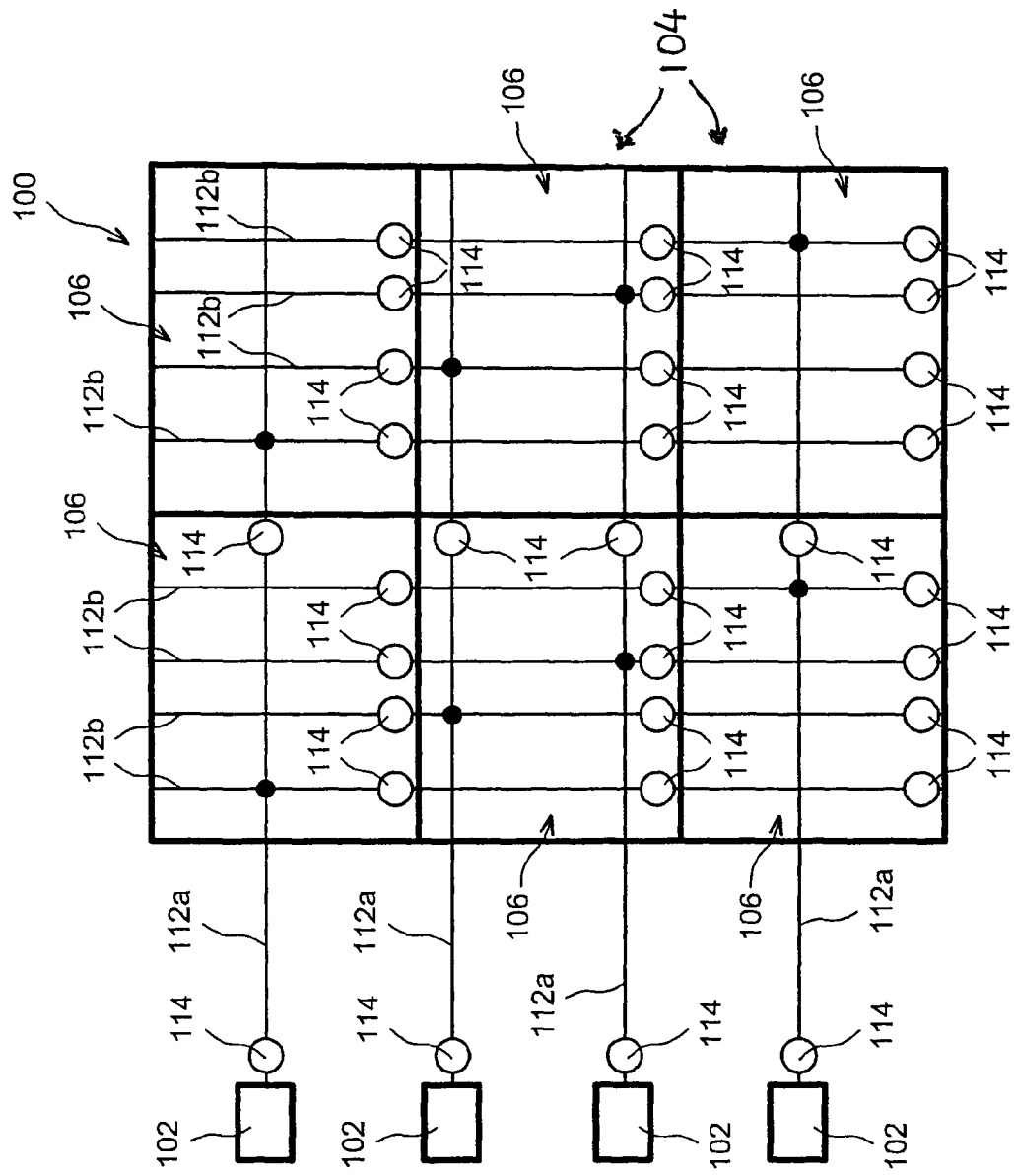
FIG. 4 shows an interconnection network forming dynamic links between four processors and a shared memory divided into six memory blocks.

We will now refer to FIG. 4 that shows an interconnection network 100 according to one particular embodiment, which allows four processors 102 to write or read data in a shared memory 104, comprising several memory blocks 106 (six of which are shown in FIG. 4), simultaneously and independently of each other. This interconnection network 100 comprises several sub-networks, each sub-network connecting one of the processors 102 to the six memory blocks 106 by means of at least one information transfer bus and one addressing bus. Each sub-network is composed of several bundles of electrically conducting wires or conducting portions (for example conducting tracks), forming an information transfer bus and an addressing bus between one of the processors 102 and each of the memory blocks 106. FIG. 4 only shows the information transfer buses comprising portions of conducting tracks 112a and 112b on which data to be written to or read from the four sub-networks transit, each connecting the processors 102 to the six memory blocks 106.

The information transfer buses of these sub-networks are two-directional and are capable of routing signals sent by one of the processors 102 to be written in the memory 104, and/or data signals that are read by one of the processors 102 from this memory 104 and/or data signals routed from one of the memory blocks 106 to one or several other memory blocks 106. The information transfer buses can also be configured, in other words each data signal emitted on these buses is only transmitted to the memory block 106 or to the processor 102 to which this signal is addressed.

In the embodiment described herein, the addressing buses (not shown) are used to route addressing signals of destination memory blocks 106, the values of which denote the memory blocks 106 in which the read or write operations will be done. These addressing buses are not configurable because unlike signals emitted on the information transfer buses, the addressing signals sent on the addressing buses are transmitted to all memory blocks 106 so that each memory block can analyse these data, the memory block 106 concerned may be activated and a communication path may be set up between the sending processor 102 and the destination memory block 106.

The number and arrangement of sub-networks wire bundles are adapted to the form and dimensions of the shared memory 104. In the example shown in FIG. 4, since the memory blocks 106 are arranged in two columns of three memory blocks 106, each bus in the interconnection sub-network comprises two bundles of vertical wires 112b, each of these bundles connecting the memory blocks 106 of one column to each other, and a bundle of horizontal wires 112a connecting one of the processors 102 to the two bundles of vertical wires 112b.

The bundles of wires 112a and 112b in each bus of each sub-network are segmented into several parts. Thus, the length of each wire segment is reduced to limit the capacitances formed by these wire segments. Signal repeater devices 114 are arranged between each wire segment in each bundle of wires to connect these wire segments together and to form continuous communication paths. In particular, the repeater devices 114 can adjust the slope of the transmitted signal so that amplitude signals are transmitted within a sufficiently short time to all bundles of wires, between the processors 102 and the memory blocks 106.

The arrangement of the different elements in each sub-network may be chosen depending on the frequency at which these elements are used. For example, when one of the processors 102 communicates very frequently with one of the memory blocks 106, it will be possible to form the shortest possible path between this processor 102 and this memory block 106. Therefore, the topology of the sub-networks can be chosen as a function of the use of these sub-networks by the different circuits connected through these sub-networks.

For example, a repeater device 114 may be provided every 500 µm at a bundle of horizontal wires 112a, and every 250 µm at a bundle of vertical wires 112b. Therefore these dimensions also correspond to the lengths of wire segments used in this interconnection network 100. These dimensions are given simply as examples and depend on the technology used to make the different elements of the interconnection network 100. On the example shown in FIG. 4, two repeater devices 114 are arranged at each bundle of horizontal wires 112a connecting the processors 102 to the bundle of vertical wires 112b. Three repeater devices 114 are present on each bundle of vertical wires 112b, each repeater device 114 also being connected to one of the memory blocks 106.

In this case, this structure of wire bundles 112a, 112b and repeater devices 114 is similar for each sub-network, thus facilitating the design and manufacturing of the interconnection network 100.

In one variant, the interconnection network 100 may comprise a different number of wire bundles and therefore buses. Furthermore, different and/or additional signals to those described above may also be emitted on the buses of the interconnection network 100. In general, the architecture of the interconnection network 100 and the signals emitted on this network depend on the architecture of elements that will be connected through the interconnection network 100.

Each of these repeater devices 114 may or may not be activated depending on whether or not it is electrically powered. It is thus possible to define a single communication path in each sub-network by activating only the repeater devices 114 on the path between the processor 102 and the memory block 106 in which the processor 102 will write data or from which the processor 102 will read data.

Each memory block 106 comprises a control device, not shown and also called a selection arbitrator, which may or may not select this memory block 106 and may or may not activate the repeater device 114 associated with it, for example by powering or not powering it or making or not making it conducting, depending on addressing data sent by the processor 102 on the addressing bus. The memory block 106 is selected by the arbitrator that is associated with it when the addressing data transmitted on the addressing bus select this memory block 106 to perform a data read or write operation. Otherwise, if the memory block 106 associated with this arbitrator is not the memory block in which the read or write operation is to be done, the arbitrator does or does not activate the repeater device 114 connected to the memory block 106 associated with this arbitrator, depending on whether or not the repeater device 114 is on the path connecting the processor 102 and the memory block 106 in which the read or write operation is to be done. Data are transmitted within one of the memory blocks 106 through an internal bus, not shown, that is also connected to the repeater device 114 associated with the memory block 106.

The selection arbitrators can also manage access priority to the memory blocks 106 when several processors want to simultaneously access the same memory block 106 through different sub-networks.

Figure 5A:
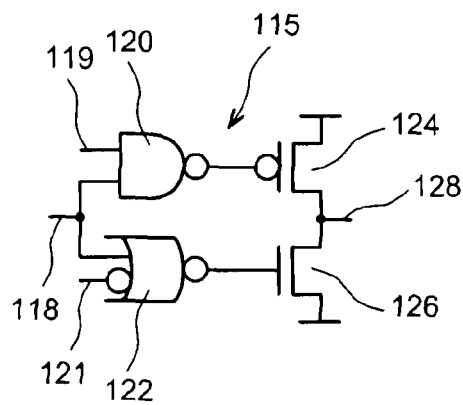
FIGS. 5A and 5B show an example embodiment and a symbol of a repeater respectively, forming part of a repeater device used in an interconnection network.
Figure 5B:
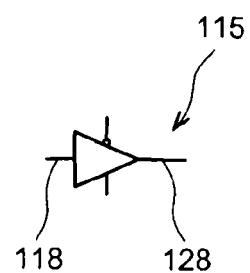

The repeater devices 114 are made from repeaters 115. One example repeater 115 is shown in FIG. 5A. This repeater 115 comprises an input 118 connected to an input of a NAND gate 120 and an input to a NOR gate 122. The data transmitted by the repeater are applied to this input 118. The read/write signal is applied to the second input 119 of the NAND gate 120 and to a second input 121 of the NOR gate 122. The inverse output from the NAND gate 120 is connected to the gate of a first MOS transistor 124, and the output from the NOR gate 122 is connected to the gate of a second MOS transistor 126, the source of the first transistor 124 being connected to the drain of the second transistor 126 and forming an output 128 from the repeater 115. This repeater 115 may be represented by the symbol shown in FIG. 5B. Such a repeater 115 sends a bit to its output with a value identical to a bit applied to the input. Furthermore, the level or amplitude of the output signal is constant and does not depend on the level of the input signal. The repeater 115 will or will not send an output bit, depending on the binary value of the read/write signal.

Figure 6:
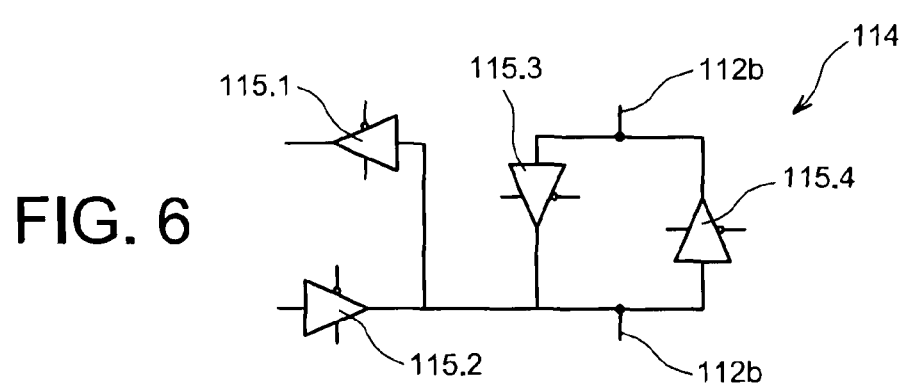
FIGS. 6 and 7 show example repeater devices forming part of an interconnection network.

The repeater devices 114 present on the bundles of vertical wires 112b repeat the information on these wire bundles, but also they transmit information from or to the memory blocks 106. An example of a repeater device 114 located on one of the bundles of vertical wires 112b is shown in FIG. 6. It comprises two repeaters 115.1 and 115.2 arranged head-foot and in particular connected to the internal bus of the memory block 106. These two repeaters 115.1, 115.2 are controlled by the value of the read/write signal, one being active while the other is inactive. In the example in FIG. 6, the repeater 115.1 is active when data are written into the memory block 106 (the repeater output 115.1 is connected to the data bus), while the second repeater 115.2 is active when data are read from the memory 106 (the repeater input 115.2 is connected to the data bus). Thus, only one of the two repeaters 115.1, 115.2 is active during a read or write operation. Two other repeaters 115.3 and 115.4 form an interface between two segments in the bundle of vertical wires 112b. In the same way as for repeaters 115.1, 115.2, only one of the two repeaters 115.3, 115.4 is active during transmission of information, depending on whether the read or write data are being transmitted and depending on the location of the repeater device 114 on the bundle of vertical wires 112b.

The repeater devices 114 present on the bundles of horizontal wires 112a are used either to transmit information between one of the processors 102 and a segment of one of the wire bundles 112a, or to repeat information between two segments of the bundle of horizontal wires 112a. In one variant, such a repeater device may also make a repetition interface between one of the bundles of vertical wires 112b and one of the bundles of horizontal wires 112a.

Figure 7:
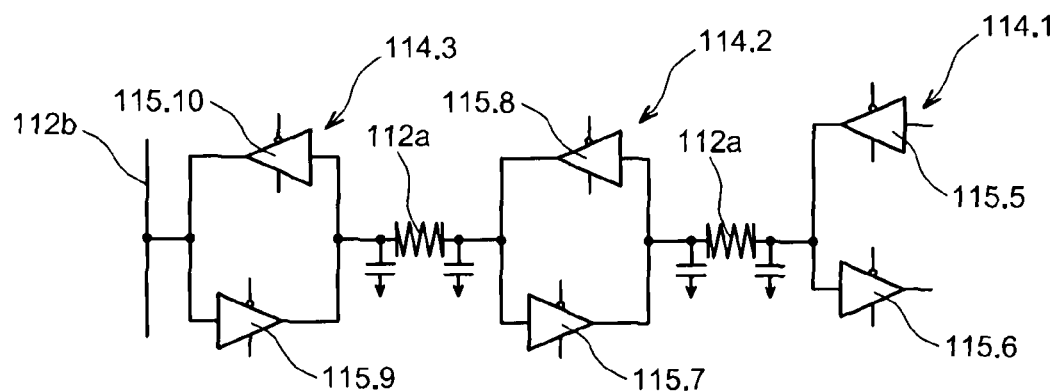

Examples of these different repeater devices are shown in FIG. 7. We will start by describing a first repeater device 114 designed to form an interface between a segment of a bundle of horizontal wires 112a and one of the processors 102. The first repeater device 114.1 comprises a repeater 115.5 controlled by the read/write signal, the input of which is connected to the processor 102 and the output of which is connected to the segment of the bundle of horizontal wires 112a. This repeater 115.5 is active when a write information operation is being done in one of the memory blocks 106, this information being transferred from the processor to the destination memory block 106. This first repeater device 114.1 also comprises a second repeater 115.6 mounted head-foot relative to the repeater 115.5 and also controlled by the read/write signal, the input of which is connected to the segment of the bundle of horizontal wires 112a and the output to the processor 102. The second repeater 115.6 is active during an operation to read information from one of the memory blocks 106, this information travelling from the memory block 106 to the processor 102. This second repeater 115.6 could also be replaced by a NAND gate, one of the inputs of which would be connected to the segment of the bundle of wires 112a, the read/write signal being applied to a second input of this NAND gate, and the output of which would be connected to the processor 102.

A second repeater device 114.2 placed between two segments of a bundle of horizontal wires 112a, comprises two repeaters 115.7 and 115.8 mounted head-foot relative to each other and both controlled by the read/write signal. Thus one of these two repeaters 115.7, 115.8 is active depending on whether a read or write data operation is being done. A third repeater device 114.3, for example similar to the repeater device 114.2, may be located between a segment of a bundle of horizontal wires 112a and a segment of a bundle of vertical wires 112b.

The arbitrators, or control devices, are designed generically by combinational logic elements. Thus, all arbitrators include the same logical structure made from identical logical circuits. A physical address, for example that may be hard coded in the memory 104, is assigned to each arbitrator as a function of its physical location in the memory, in other words as a function of the location of the memory block 106 with which it is associated. Operation of these arbitrators is governed by logical functions that activate only useful repeater devices, in other words devices located on the path between the processor and the memory block in which the information is read or written. The logical functions are such that the most direct path, in other words the path that requires the least number of active repeater devices, is created by activating the right repeater devices. The other repeater devices are then inactive so as to limit electricity consumption in the interconnection network 100. In the configuration shown in FIG. 4, the minimum path between one of the processors 102 and one of the memory blocks 106 implies activation of two repeater devices 114, one of which is on the bundle of horizontal wires 112a and one is on the bundle of vertical wires 112b. The longest path corresponding to a communication between a processor located in one of the corners of the system and a memory block 106 located in the corner opposite the corner containing the processor, implies the activation of five repeater devices 114, two of which are on one of the bundle of horizontal wires 112a and three are on one of the bundle of vertical wires 112b.

In the example shown in FIG. 4, the memory 104 comprises six memory blocks 106. The addresses of the memory blocks 106 may be coded on three bits, herein referred to as ADDB(2:0). Since the six memory blocks 106 are distributed in two columns of three memory blocks, addresses can be assigned to the memory slots such that the high order bit (ADDB(2)) of an address in a memory block 106 indicates the column in which the memory block is located (for example with the value ADDB(2)=0 for the first column, ADDB(2)=1 for the second column). Thus, starting from the value of ADDB(2), it can be determined what repeater devices 114 are arranged on the bundles of horizontal wires 112a that are to be activated. Similarly, and since each repeater device 114 arranged on one of the bundles of vertical wires 112b is located at a memory block 106, the values of the bits ADDB (1:0) may be used to determine which repeater devices 114 arranged on the bundle of vertical wires 112b are to be activated.

In one variant, the addresses of the repeater devices can be coded on a larger number of bits. The logical functions used are adapted as a function of the architecture and the configuration of the interconnection network.

Thus, by using these logical functions and only activating the repeater devices 114 actually useful for transmission of the information on a given path between one of the processors 102 and one of the memory blocks 106, much of the electrical energy that was previously used to supply power to all repeater devices in an interconnection network, can be saved. This principle is particularly applicable to information transfer bus repeater devices because these buses are the largest source of electricity consumption in an interconnection network.

Electricity consumption of the interconnection network depends largely on two factors: the activity ratio in the network which corresponds to the frequency at which wires change state (0 or 1 depending on the value of the signals) relative to the operating clock frequency, and the geographic location of the processor relative to the destination memory slot, in other words the length of the communication path that is proportional to the number of repeater devices to be activated. The electricity consumption of the interconnection network 100 can also be reduced by optimising placement of data in memory blocks 106. For example, if information is used by one of the processors more frequently than other processors, the data about this information may preferably be located in a memory block 106 adjacent to this processor, thus reducing the number of repeater devices to be activated to access this information. This optimisation in the placement of data in memory blocks 106 may be done particularly by a code compilator, for example when the data are machine code instructions stored in the memory 104.

The invention claimed is:

1. An interconnection network with m first electronic circuits and n second electronic circuits, comprising m interconnection sub-networks, each interconnection sub-network comprising:
at least one addressing bus and one information transfer bus connecting one of the m first circuits to all the n second circuits, the information transfer bus comprising a plurality of portions of signal transmission lines connected to each other through signal repeater devices, and
means for controlling the signal repeater devices, at least one of the signal repeater devices is controlled to be active depending on a value of an addressing signal to be sent to the addressing bus by said one of the m first circuits to the means for controlling, the at least one of the signal repeater devices controlled to be active forms a communication path in the information transfer bus for data signals between said one of the m first circuits and at least one of the n second circuits and/or between at least a first one of the n second circuits and at least a second one of the n second circuits,
where m and n are integer numbers greater than 1.

2. The interconnection network according to claim 1, in which the m first circuits comprise processors and/or the n second circuits comprise memory blocks of a memory shared by the m first circuits.

3. The interconnection network according to claim 1, in which the signal repeater devices on the information transfer bus are two-directional.

4. The interconnection network according to claim 1, in which the addressing bus comprises a plurality of portions of signal transmission lines connected to each other by the signal repeater devices.

5. The interconnection network according to claim 1, in which the signal repeater devices comprise logical circuits.

6. The interconnection network according to claim 1, in which the means for controlling also comprises a selector of at least one of the n second circuits to make at least one data read and/or write operation in said one of the n second circuits and/or a managing device of the access priority to the n second circuits by the m first circuits and/or a device for storing several addresses of several second circuits.

7. The interconnection network according to claim 1, in which the means for controlling comprises a plurality of control devices, each control device of the plurality of control devices makes one of said signal repeater devices active or inactive as a function of the value of the addressing signal.

8. The interconnection network according to claim 7, in which the n second circuits comprise memory blocks of a shared memory, and the control devices are implemented in the shared memory.

9. The interconnection network according to claim 7, in which the means for controlling comprises n control devices.

10. The interconnection network according to claim 7, in which each of the control devices comprises similar logical circuits, a distinct code being designed to be applied at an input to each control device to identify at least one of the n second circuits.

11. The interconnection network according to claim 1, in which each interconnection sub-network comprises a second information transfer bus comprising a plurality of portions of signal transmission lines connected to each other through second signal repeater devices, the means for controlling makes at least one of the second repeater devices active as a function of the value of the addressing signal, the at least one of the second repeater devices controlled to be active forms a signal communication path between said one of the m first circuits and said one of the n second circuits or between said first of the n second circuits and said second of the n second circuits, in the second information transfer bus.

12. The interconnection network according to claim 1, in which the m interconnection sub-networks operate independently of each other.

13. An interconnection network with m first electronic circuits and n second electronic circuits, comprising m interconnection sub-networks, each interconnection sub-network comprising:
at least one addressing bus and one information transfer bus connecting one of the m first circuits to all the n second circuits, the information transfer bus comprising a plurality of portions of signal transmission lines connected to each other through signal repeater devices,
a controller device that controls the signal repeater devices, at least one of the signal repeater devices is controlled to be active depending on a value of an addressing signal to be sent to the addressing bus by said one of the m first circuits to the controller device, the at least one of the signal repeater devices controlled to be active forms a communication path in the information transfer bus for data signals between said one of the m first circuits and at least one of the n second circuits and/or between at least a first one of the n second circuits and at least a second one of the n second circuits,
where m and n are integer numbers greater than 1.

* * * * *